May 10, 1927.
A. H. TYSON
1,628,342
METHOD OF AND MECHANISM FOR PERFORATING PLASTIC MATERIAL
Filed Aug. 15, 1922    3 Sheets-Sheet 1
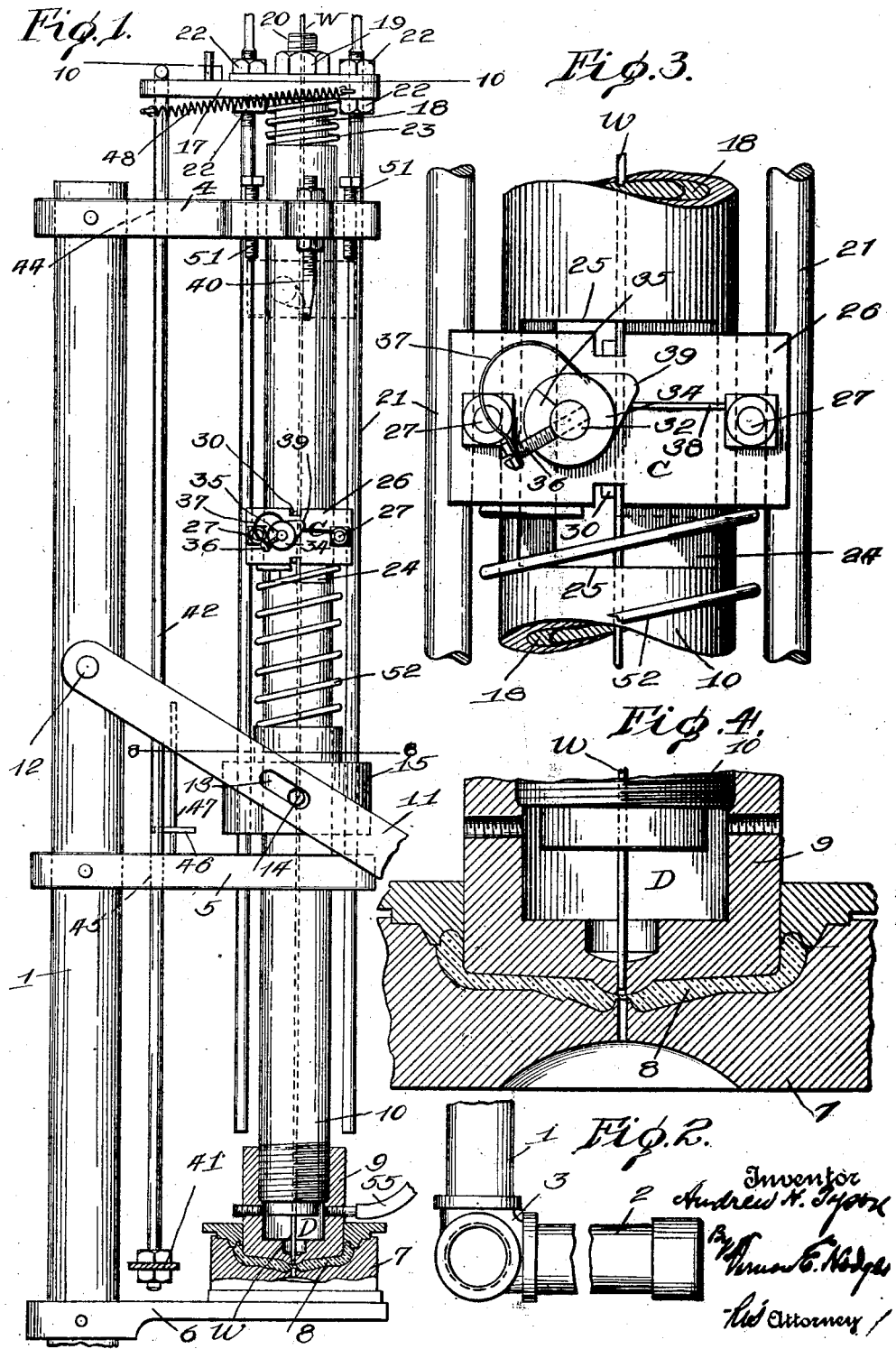

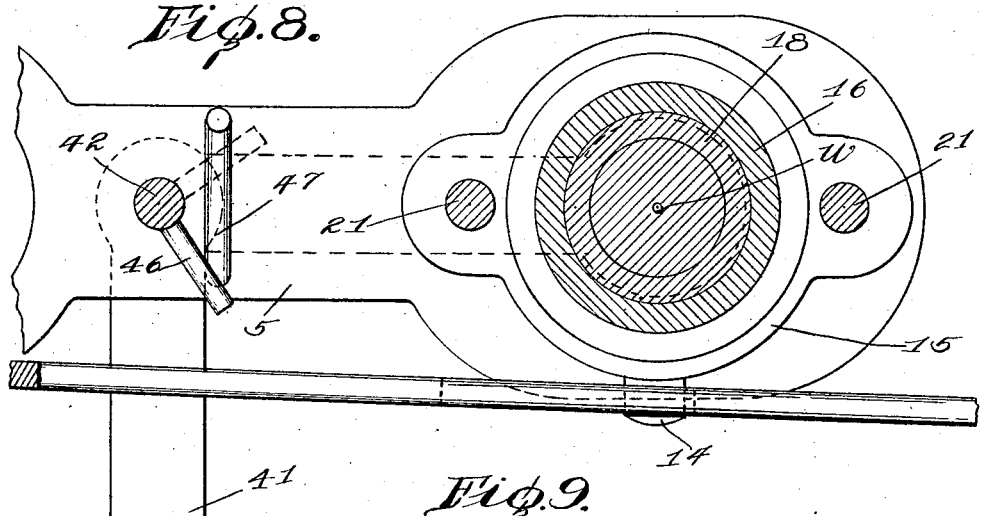
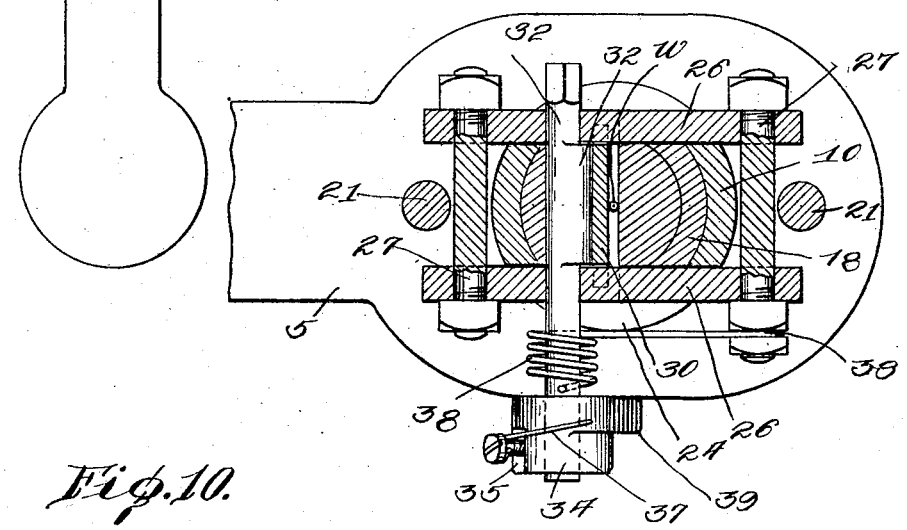
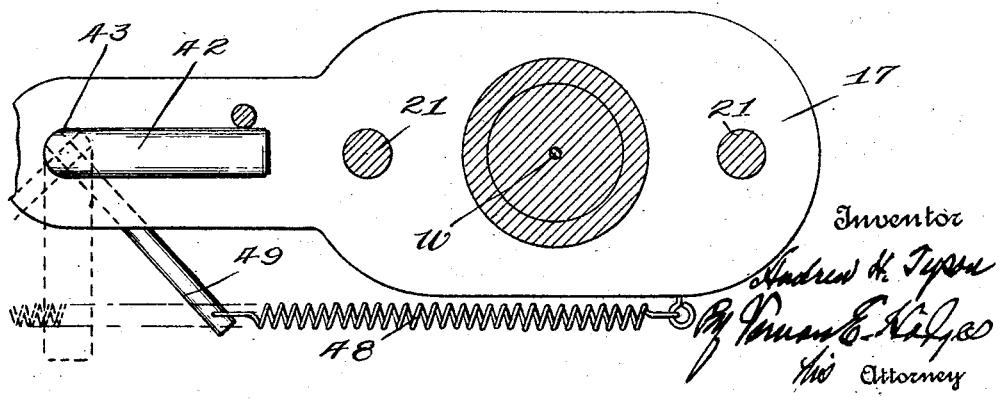

Patented May 10, 1927.

1,628,342

UNITED STATES PATENT OFFICE.

ANDREW H. TYSON, OF WASHINGTON, DISTRICT OF COLUMBIA.

METHOD OF AND MECHANISM FOR PERFORATING PLASTIC MATERIAL.

Application filed August 15, 1922. Serial No. 582,000.

My invention relates to an improvement in method of, and mechanism for, perforating plastic material.

The primary feature of this invention is the concealment and protection provided a piercing-pin just prior to its piercing a hole through hot, semi-plastic molded material while still held in the mold.

Another object is to provide means for withdrawing the piercing device, immediately after the hole is pierced, from the hot molten mass.

Another object is to provide means for regulating automatically the feeding of the hole-forming device.

Still another object is to provide protection for the hole forming device before, or preliminary to, the piercing operation of the molded article.

Further objects will be apparent as the details are more fully described.

With these several objects in view, this invention consists in means for forming a small hole in glass while held in the mold and still in a hot molten state.

The invention includes mechanism for forming a minute hole in an article made from vitreous material immediately following its formation, and while held between the mold and plunger in a semi-molten state, and immediately withdrawing the hole forming pin before the glass becomes set or hard.

The invention further consists in mechanism for alternately feeding and withdrawing the pin a predetermined distance at precisely timed intervals following the formation of the article to be perforated, and while the same is still held in the mold in a hot and plastic state.

It further consists in mechanism for automatically feeding and regulating the feed of the pin to the required point as the end becomes consumed from the heat and wear.

The invention further includes means for cooling the pin.

The invention includes a clutch releasing mechanism, in connection with a stop against which the wire which forms the pin is lowered to regulate its length and position, as wear on the end takes place.

This invention further includes a plunger, a pin movably concealed in the plunger, and means for discharging a jet of cool air within the plunger in contact with the pin to keep down the temperature of the latter.

In the accompanying drawings:—

Fig. 1 is a view in side elevation;

Fig. 2 is a fragmentary view of the base or foot of the frame;

Fig. 3 is an enlarged view of a portion of the machine showing the gripping cam;

Fig. 4 is an enlarged section through the mold and the lower end of the plunger;

Fig. 8 is an enlarged horizontal section on line 8—8 of Fig. 1;

Fig. 9 is a horizontal sectional view on line 9—9 of Fig. 7;

Fig. 10 is an enlarged horizontal section on line 10—10 of Fig. 1.

Figures 5, 6:
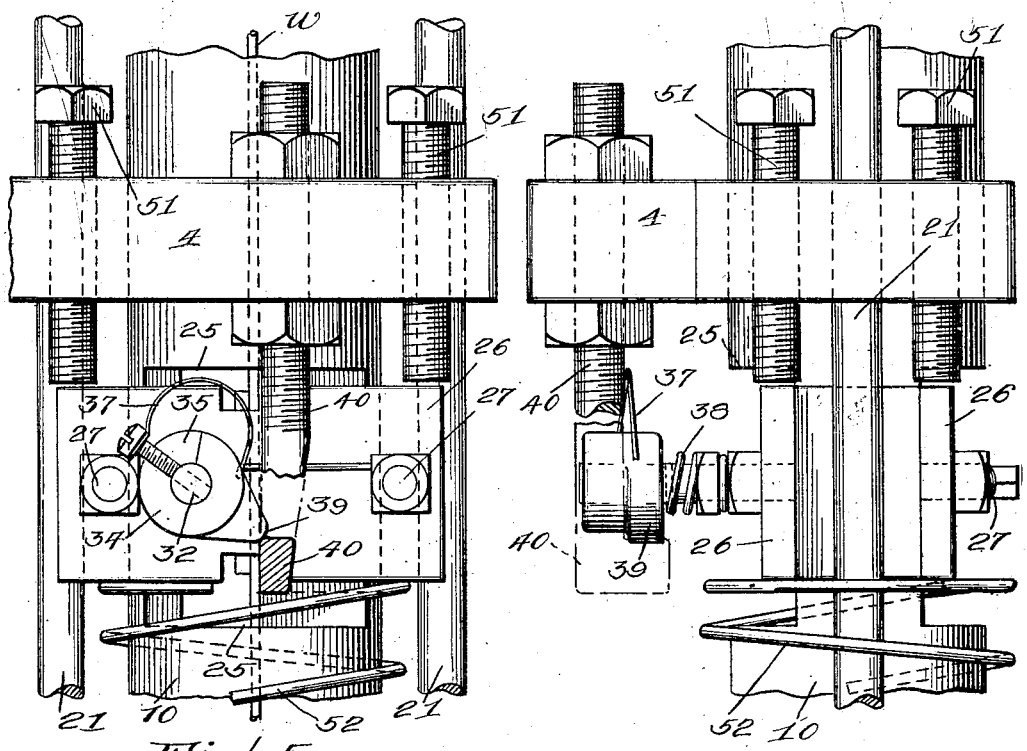
Fig. 5 is an enlarged fragmentary view of the portion shown in Fig. 3, showing a change in the position of parts.
Fig. 6 is a view of the same taken at right-angles.
Figure 7:
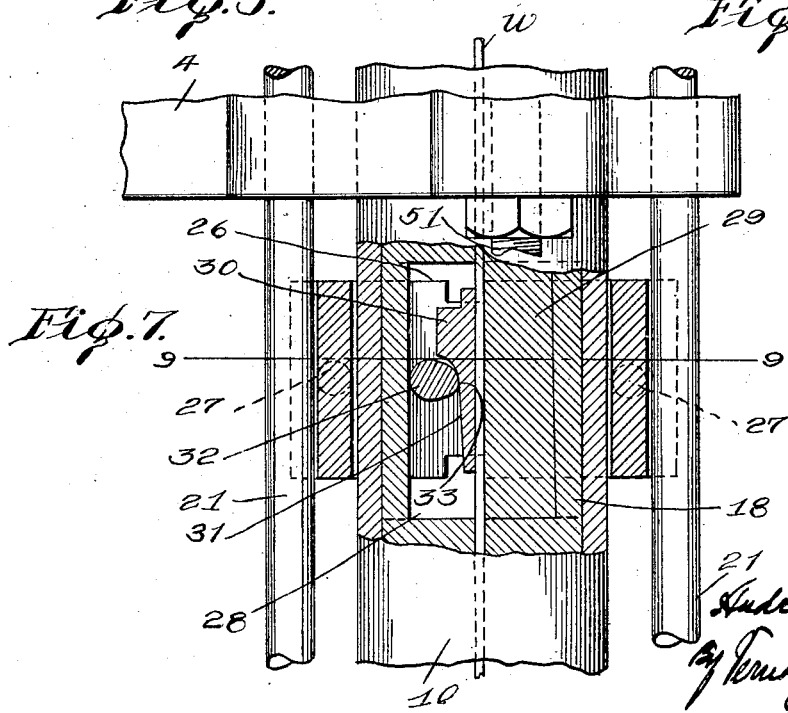
Fig. 7 is an enlarged view corresponding to Fig. 3, but in section.

The numeral 1 represents a vertical column, 2, a base, and 3, a four-way elbow joining the column and base and forming a means upon which the machine rests and is supported.

At intervals, the horizontal plates 4 and 5 are secured to the vertical column, and extend laterally in the same direction, and form a part of the frame. The numeral 6 indicates the mold-support, and 7 is the mold; and 8, is the article formed in the mold—in this instance a glass fruit jar cap. The numeral 9 indicates a hollow plunger between which and the mold 7 the article 8 is formed.

The shape of the mold and plunger is such that the glass is purposely made very thin at the center of the cap, as shown in Figs. 1 and 4, preparatory to piercing the hole through the cap at this point.

The end of the wire is withheld and is not exposed until after the article is molded, and the intensity of the heat of the molten mass has been largely spent, following which, however, the wire is fed down through the plunger, and its lower end is caused to pierce a hole through the glass at the thin center, while still in its molten state, after which the end of the wire is immediately withdrawn therefrom.

Since some mechanism for gripping, feeding, releasing and regulating the position of this wire in the machine is essential to the invention, mechanism for accomplishing this will now be described.

The wire W is brought down through the center of the pipe 10. On the threads 10' of the lower end of this pipe, the plunger 9 is screwed. This pipe extends vertically through the orifices formed therefor in the plates 4 and 5, which guide it in its vertical movement.

Hand-lever 11 is connected to the vertical column 1 by a pivot 12, and is provided with a slot 13, which receives the pin 14 on the collar 15, which latter is slidably mounted around the pipe 10, and the raising and lowering of this lever 11 by the operator controls the entire mechanism of the machine, namely the molding of the article and the piercing of the hole through its center at properly timed intervals.

A header 17 is bolted securely to the upper end of a slide 18 by means of a nut 19 screwed down upon the threaded upper end 20 of the slide 18. A pair of guide-rods 21 are bolted rigidly to the header 17 by nuts 22 screwed on the threads above and below the header, and these guide-rods extend through the holes formed therefor in the plates 4 and 5, through which they have a sliding movement. These guide-rods 21 also extend through the collar 15 to which they are secured. The stiff spiral spring 23 is sleeved upon this slide 18 between the header and the upper end of the plunger pipe 10 exerting downward pressure upon the latter.

While the plunger 9 and plunger pipe 10 have approximately a seven (7") inch stroke with the raising and lowering of the hand-lever 11, the slide 18 has approximately a one-half (½") inch movement within the pipe 10.

The pipe 10 and slide 18 are cut away on opposite sides somewhere near the center to form the slots 24 and 24' respectively, the upper and lower ends of which slots form stops 25 and 25'. Plates 26 extend transversely through these slots and are secured together by means of winged spacing bolts 27 (see Fig. 9) thus forming a cross-head C. The relative width of these plates 26 and the slots 24 and 24' in the pipe 10 and slide 18 define the relative movement between the slide 18 and the pipe 10, as the purpose of this movement is to allow for gripping the wire, feeding it downward to cause the end to pierce the hole in the glass cap, and to withdraw the wire into the plunger after the hole shall have been pierced, and afterwards release the wire to gauge its length preliminary to the next operation.

In the slide 18, a slot 28 is formed, and within this slot there are two wire gripping jaws, namely the fixed jaw 29 and the movable jaw 30 between which the wire W extends.

The movable jaw 30 has an inclined rear surface 31. A rock-shaft 32 is mounted to turn in the plates 26. This rock-shaft has a cam 33 thereon in position to engage the inclined rear surface 31 of the gripping jaw 30.

This gripping action is automatically controlled by any approved mechanism, for example an eccentric 34 is loosely mounted on the rock-shaft 32, and has a limited movement thereon as defined by the segmental slot 35 (see Figs. 1, 3, 5 and 9). A screw 36 extends through this segmental slot 35 into the rock-shaft 32, and a hair-spring 37 is connected to the screw 36 and to one side of the eccentric 34 and is of sufficient strength to restore the eccentric to its normal position on the rock-shaft. The rock-shaft itself is held under tension by a stiff spiral spring 38, one end of which is secured to the rock-shaft, and the other at some convenient point, for instance on the end of one of the bolts 27 (see Fig. 9).

A nose 39 on the eccentric actuates the gripping mechanism by which the grip upon the wire W is controlled. Normally the tension of the spring 38 holds the cam 33 in the position shown in Figs. 1, 3, 7 and 9, that is to say with the wire W held fast between the jaws 29 and 30. This causes the wire W to move with the slide and plunger pipe when the two are moving together during the major portion of the stroke of the machine, and when in this position the nose 39 is in the path of an L-shaped trip 40, depending from the upper plate 4 of the frame, upon striking which toward the end of the upper stroke of the machine, the shaft 32 is rocked to the right, as indicated by the dotted lines in Fig. 1 and the full lines in Fig. 5, thereby swinging the cam 33 away from the sloping surface 31 on the back of the jaw 30. This leaves the wire free, which thereupon drops by gravity a very short distance through the machine, until it strikes a stop 41 provided for the purpose. This provision is made to compensate automatically for wear and exhaustion of the piercing pin at the lower end of the wire W, due to the intense heat of the molten glass, even though the piercing is through a very thin film of glass at the center of the cap and but momentary.

The stop 41 is secured on the lower end of a spindle 42 which is suspended from and through a hole 43 in the header 17 as shown in Figs. 1 and 10, and is slidable through holes 44 and 45 in the plates 4 and 5, respectively, of the frame. The spindle 42 has a finger 46 extending radially therefrom, and this is held in contact with the cam rod 47, which is set at an angle of perhaps 45° by the tension of a spring 48 extending from a stud 49 on the upper end of the spindle to some part of the header, which has the effect of imparting a quarter turn to the spindle with each upward or downward stroke of the plunger.

This quarter turn brings the stop 41 from the position shown in Fig. 8 in full lines to the position indicated in dotted lines therein on the upward stroke, thus bringing the stop 41 immediately under the wire by a gradual turn of the spindle 42, which position it reaches prior to the end of the upstroke of the machine, and immediately preceding the contact of the nose 39 on the eccentric striking the trip 40. The striking of the trip causes the instant release of the wire, whereupon the latter drops a fraction of an inch until caught by the stop 41 therebeneath. This mechanism insures a proper elevation of the wire or piercing-pin W preceding each operation of piercing a hole.

With the further upward movement of the cross-head C, the nose 39 of the eccentric clears the trip, as it is about to do in Fig. 5. The spring 38 rocks the shaft 32 back to the position shown in Figs. 1, 3, 7 and 9, causing the wire W to be re-gripped between the faces of the clutching mechanism 29 and 30. While this re-gripping takes place, just prior to the end of the upstroke of the moving parts of the machine, nevertheless this re-gripping does not occur until the cross-head C has reached the set-screws 51, and its further upward movement has thereby been arrested, while the slide 18 and plunger pipe 10 continue on upward with the further lifting of the lever 11, the spring 52 being compressed thereby, by the shortening of the space between the cross-head C and the hub of the collar 15.

The hand-lever 11, with its connected parts, have now reached the limit of their upward movement. This action permits the gripping mechanism to take a lower hold upon the wire.

With the downward movement of the hand-lever 11, on reversing the motion of the machine, that is to say by lowering the hand-lever 11, the slide 18 and plunger pipe 10 move together in the relative position of parts shown in Fig. 1, due to the pressure of the spring 52. This relativity of parts continues until the hand-lever has reached the point shown in Fig. 1 and the cap has been molded, whereupon the further downward movement of the hand-lever from this point to the end of its downstroke causes the slide 18 to move downward through the plunger pipe 10, which latter has been arrested by the molten glass which the plunger is fashioning in the mold. This causes the upper shoulder 25' of the slide 18 to press downwardly against the cross-head C against the expansive action of the spring 52, and to cause the lower end of the wire W to pierce a hole through the thin center of the cap. This movement of the wire through the plunger 9 and plunger pipe 10 is defined by the width of the slots 24 in the side of the pipe 10.

On lifting the hand-lever 11, the slide 18 is raised, and with it the cross-head C with the wire W, which cross-head moves from the bottom of the slot 24 to the top, thereby striking the upper shoulder 25, the stiff spiral spring 52 holding the plunger pipe 10, plunger 9 and the wire W all in the position which is viewed in Fig. 1 of the drawings.

From the foregoing, it will be seen that the end of the wire W is concealed and protected from the intense heat of the molten material which has spent its intensest heat between the brief period that intervenes between the molding and the hole piercing operation, the wire remaining concealed and protected within the plunger except as it is momentarily projected, after which it is returned to the position shown in Figs. 1 and 4.

A blast of air is supplied to the chamber D of the plunger through air pipe 55 to assist in cooling the piercing end of the wire.

The further operation of the machine is merely a repetition of the cycle of motions that have been described.

In this way, the wear and consumption of the wire is very slight, and it is always held in uniform position; in other words, it is automatically re-adjusted with each complete cycle or up and down stroke of the machine.

Too much emphasis cannot be placed upon the concealment and protection provided for the piercing-pin, afforded by the plunger, within which it rests, during the formation of the molded article, preparatory to its projection from its hiding-place through the molded article to form the hole and its immediate withdrawal therefrom back into the plunger.

It should be understood that in molding glass where hollow ware is being manufactured, the molten mass is always pierced with some kind of a pin or plunger for the purpose of injecting a jet of compressed air to assist in the formation of the article in process of making, and the size of such pins ranges from about one-fourth of an inch in diameter, upward. But the art of using a minute pin to puncture glass in the process of making has failed in all the many attempts heretofore made in this direction, from a successful manufacturing standpoint, and has generally been abandoned because the intense heat of molten glass (about 3300° F.) has always quickly melted off the pins. My invention throws new light on perforating or rather pressing minute holes entirely through glass while in the process of making, involving two new principles, i. e., (1) the necessity of first pressing the molten glass into a very thin film at the point where it is to be perforated; and, (2) withholding the pin from coming into contact with the molten mass until its heat has been greatly reduced, which instantly occurs by being pressed into shape, and especially so if into a thin film or wall at the point where the puncture is to be made. As above stated, the molten mass instantly loses its white heat, and immediately thereafter, the perforating pin is thrust forward from its concealment in the plunger, through the thin wall or film of glass which is yet plastic, and being firmly held between two suitable metallic pieces of the mold, and the pin is quickly withdrawn, thus forming a perfect but desired small hole. In this way, many thousands of perforations may be made with the same small perforating pin without its being melted off.

I claim:

1. The method of piercing a hole through material, including molding the material, supporting the molten material by a mold, and forcing a perforating pin forward from its concealed position entirely through the molten material while held in said mold.

2. The method of piercing a hole through material, including molding the material, supporting the molten material by a molding device, concealing a perforating pin by a part of said molding device, and forcing said pin forward from its concealed position entirely through the molten material while held in the molding device.

3. The method of piercing a hole through material while in a plastic condition, including molding the material, supporting the molten material on opposite sides by the mold, and forcing a perforating pin forward from its concealed position entirely through the molten material while held in the mold.

4. The method of piercing a hole through material while in a plastic condition including molding the material, forming said molten material into a thin wall or film at the point where the perforation is to be made, supporting opposite sides of the material at said point, and forcing a perforating pin forward from its concealed position entirely through the material while held in the mold.

5. The method of piercing a hole through material while in a plastic condition including molding the material, forming said molten material into a thin wall or film at the point where the perforation is to be made, supporting the opposite sides of said thin wall or film, and forcing a perforating pin forward from its concealed position entirely through the thin wall or film of the material while held in the mold.

6. The method of piercing a hole through material while in a plastic condition including molding the material, forming said molten material into a thin wall or film at the point where the perforation is to be made, supporting the opposite sides of said thin wall or film by the mold, and forcing a perforating pin through said thin wall or film.

7. The method of piercing a hole through material while in a plastic condition including forming the molten material into a thin wall or film at the point where the perforation is to be made, supporting the opposite sides of said thin wall or film, and forcing a perforating pin entirely through the thin wall or film while supported.

8. The method of piercing a hole through material including molding the material, forming said molten material into a thin wall or film at the point where the perforation is to be made, and forcing a perforating pin entirely through the material.

9. The method of piercing a hole through material while in a plastic condition including molding the material, forming the molten material into a thin wall or film at the point where the perforation is to be made, and forcing a perforating pin entirely through the thin wall or film of material.

10. The method of piercing a hole through material while in a plastic condition including molding the material, forming the molten material into a relative thinner wall or film at the point where the perforation is to be made than the body of the material, supporting the opposite sides of the material at said point, forcing a perforating pin entirely through the thin wall or film of material while held in the mold and withdrawing said pin.

11. Means for piercing a hole in a plastic material while still held in the mold which consists of a small wire, and gripping means for automatically gripping and releasing the wire, and for forcing the latter through the molded article while held in the mold in a semi-fluid state, and for withdrawing it from the article prior to the release of the article from the mold.

12. Means for perforating molten material including a wire, gripping mechanism, means for automatically releasing the wire and permitting the same to drop, and means for catching or stopping the wire when lowered to a predetermined position.

13. Means for forming a minute hole in plastic, vitreous material, which includes a mold, a plunger having a pin-hole therethrough, a pin, and means for holding the pin concealed and protected within the hole in the plunger during the molding of the plastic material, and which thereafter causes a projection of the pin to pierce a hole through the molded article and its withdrawal thereafter into the hole in the plunger.

14. The combination with a frame, a mold and plunger and plunger-pipe, of a gripping mechanism, a wire extending through the pipe and gripping mechanism and to the plunger, and means for automatically releasing the wire, means for catching the wire and supporting it when released, and means for automatically re-gripping the wire, the gripping mechanism having a limited sliding movement with respect to the plunger pipe.

15. Automatic means for gripping a wire, automatic means for releasing and dropping the wire, and automatic means for catching and retaining the wire until re-gripped by the gripping mechanism.

16. The combination with a frame, a plunger, a plunger-pipe slidably connected with the frame, and to which the plunger is connected, of a piercing-pin in the form of a wire extending through the pipe, means for automatically gripping and releasing the wire and for moving it endwise within the pipe and plunger, and means for discharging a cooling medium into the plunger for cooling the piercing end of the wire.

17. The combination of a frame, a pipe slidably connected therewith, a plunger attached to the pipe, a wire, gripping mechanism movably connected with the pipe and in position normally to grip the wire, means for automatically releasing the grip upon the wire when the pipe and plunger are moved to a predetermined point, means for catching and supporting the wire and regulating its descent within the pipe and plunger, and means for causing an automatic re-grip upon the wire.

18. The combination of a frame, a pipe slidably connected therewith, a plunger carried by the pipe, a collar loosely and slidably mounted upon the pipe, a slide movable within the pipe, wire gripping mechanism connected with the slide, a wire extending through the pipe, slide and gripping mechanism, means for causing the gripping mechanism automatically to engage the wire, means for automatically releasing the gripping mechanism, means for catching and supporting the wire when released, and means for causing an automatic re-grip upon the wire when the parts have moved to a predetermined position.

19. The combination of a frame, a pipe slidably connected therewith, a plunger carried by the pipe, a slide extending into the pipe, a wire extending through the slide and pipe, gripping mechanism carried by the slide for automatically engaging and releasing the wire at predetermined intervals, means for engaging and causing the release of the gripping mechanism, a collar slidably mounted on the pipe, a header connected with the slide, rods extending from the collar to the header, and a hand-lever pivotally connected with the frame and having sliding pivotal connection with the collar for moving the pipe, plunger and slide.

20. The combination of a frame, a pipe slidably connected therewith, a plunger carried by the pipe, a slide extending into the pipe, a wire extending through the slide and pipe, gripping mechanism carried by the slide for automatically engaging and releasing the wire at predetermined intervals, means for engaging and causing the release of the gripping mechanism, a collar slidably mounted on the pipe, a header connected with the slide, rods extending from the collar to the header, a hand-lever pivotally connected with the frame and having sliding pivotal connection with the collar for moving the pipe, plunger and slide, means for limiting the sliding movement between the slide and pipe, spiral springs sleeved upon the pipe and slide, one confined between the header and pipe, and the other between the collar and pressing upwardly upon the slide.

21. The combination of a frame, a pipe slidably connected therewith and carrying a plunger, a wire extending through the pipe, a slide extending into the pipe, a cross-head connected therewith, and gripping means carried by the cross-head for automatically gripping and releasing the wire.

22. The combination of a frame, a pipe slidably connected therewith and carrying a plunger, a wire extending through the pipe, a slide extending into the pipe, a cross-head connected therewith, gripping means carried by the cross-head for automatically gripping and releasing the wire, a trip for releasing the gripping mechanism, and adjustable stops in the path of the cross-head for limiting its movement in one direction.

23. The combination of a frame, a pipe slidably connected therewith and carrying a plunger, a wire extending through the pipe, a slide extending into the pipe, a cross-head connected therewith, gripping means carried by the cross-head for automatically gripping and releasing the wire, a header connected with the slide, a spindle slidably connected with the frame and rotatably connected with the header, a stop carried by the spindle, means for moving the pipe, slide and spindle endwise, and means for imparting an axial turn to the spindle as it moves endwise, whereby to turn the stop into a position beneath the wire to catch and support the latter when released by the gripping mechanism.

24. The combination of a mold having a hole therein, a plunger having an air chamber therein, and a hole through its center, a plunger pipe, a wire, means for forcing the wire through the hole in the mold, and withdrawing it into the plunger, and means for conducting a cooling medium in contact with the end of the wire in the plunger.

25. The combination of a frame, a pipe, a plunger carried by the pipe, a slide movable in the plunger, a cross-head slidably connected with the pipe in position to be moved by the slide in one direction, and means for actuating the slide and pipe both together and independently of each other a limited and predetermined distance.

26. The combination of a frame, a pipe a plunger carried by the pipe, a slide movable in the plunger, a cross-head slidably connected with the pipe in position to be moved by the slide in one direction, means for actuating the slide and pipe both together and independently of each other a limited and predetermined distance, a wire extending through the pipe, slide and cross-head, gripping means carried by the cross-head for normally gripping the wire, means for tripping the grip automatically to release the wire, means for catching and supporting the wire when released, and means for causing the gripping mechanism to take a lower grip upon the wire on re-gripping.

In testimony whereof I affix my signature.

ANDREW H. TYSON.